United States Patent
Nordbruch

(10) Patent No.: US 12,131,633 B2
(45) Date of Patent: Oct. 29, 2024

(54) METHOD FOR THE INFRASTRUCTURE-SUPPORTED ASSISTANCE OF A MOTOR VEHICLE

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/002,208

(22) PCT Filed: Jan. 27, 2022

(86) PCT No.: PCT/EP2022/051820
§ 371 (c)(1),
(2) Date: Dec. 16, 2022

(87) PCT Pub. No.: WO2022/167300
PCT Pub. Date: Aug. 11, 2022

(65) Prior Publication Data
US 2024/0013656 A1  Jan. 11, 2024

(30) Foreign Application Priority Data
Feb. 8, 2021 (DE) .................... 10 2021 201 133.0

(51) Int. Cl.
*G08G 1/07* (2006.01)
*G01S 13/91* (2006.01)
*G08G 1/01* (2006.01)

(52) U.S. Cl.
CPC ................ *G08G 1/07* (2013.01); *G01S 13/91* (2013.01); *G08G 1/0116* (2013.01);
(Continued)

(58) Field of Classification Search
CPC .. G08G 1/0116; G08G 1/0129; G08G 1/0133; G08G 1/096725; G08G 1/096783; G01S 13/91
See application file for complete search history.

(56) References Cited

U.S. PATENT DOCUMENTS 10,338,587 B2 *  7/2019  Nordbruch ....... G08G 1/096725
2019/0051160 A1   2/2019  Malkes et al.
(Continued)

FOREIGN PATENT DOCUMENTS

DE  102005046760 A1  4/2007
DE  102017220420 B3  4/2019
(Continued)

OTHER PUBLICATIONS

International Search Report for PCT/EP2022/051820, Issued May 2, 2022.
(Continued)

*Primary Examiner* — John A Tweel, Jr.
(74) *Attorney, Agent, or Firm* — NORTON ROSE FULBRIGHT US LLP; Gerard A. Messina

(57) ABSTRACT

A method for the infrastructure-supported assistance of a motor vehicle. The method includes: receiving surroundings signals which are representative of surroundings of the motor vehicle; analyzing the surroundings in order to determine a traffic situation, in which the motor vehicle is located; determining a suggestion for a traffic-directing traffic control measure for the infrastructure-supported assistance of the motor vehicle for an operator based on the determined traffic situation; outputting suggestion signals which are representative of the determined suggestion. A device, a computer program and a machine-readable storage medium are also described.

9 Claims, 2 Drawing Sheets

(52) U.S. Cl.
CPC ......... *G08G 1/0125* (2013.01); *G08G 1/0129* (2013.01); *G08G 1/0133* (2013.01)

(56) References Cited

U.S. PATENT DOCUMENTS

| | | |
|---|---|---|
| 2019/0051171 A1 | 2/2019 | Malkes et al. |
| 2020/0074852 A1 | 3/2020 | Hu et al. |
| 2020/0239031 A1 | 7/2020 | Ran et al. |
| 2020/0276931 A1 | 9/2020 | Wang |
| 2023/0282100 A1* | 9/2023 | Iken ................ G08G 1/095 701/117 |

FOREIGN PATENT DOCUMENTS

| | | |
|---|---|---|
| JP | 2020037400 A | 3/2020 |
| JP | 2020045090 A | 3/2020 |

OTHER PUBLICATIONS

Traffic Control Center Munich, "Increased Tasks for the Operational Central Operation of the District Administration Department Through the Opening of the Mittlerer Ring Südwest Tunnel and Modernisation of the TrappentreuTunnel," District Administration Department Main Department III Road Traffic Traffic Management Traffic Control, 2013, pp. 1-42.

\* cited by examiner

METHOD FOR THE INFRASTRUCTURE-SUPPORTED ASSISTANCE OF A MOTOR VEHICLE

FIELD

The present invention relates to a method for the infrastructure-supported assistance of a motor vehicle, to a device, a computer program and a machine-readable storage medium.

BACKGROUND INFORMATION

Japan Patent Application No. JP 2020 037 400 A describes vehicle support by an RSU (roadside unit).

German Patent No. DE 10 2017 220 420 B3 describes a method for producing a traffic information collection.

Japan Patent Application No. JP 2020 045090 A describes a method for supporting automatic control of a vehicle.

U.S. Patent Application Publication No. US 2020/0276931 A1 describes a method for vehicle interaction for an autonomous vehicle.

SUMMARY

An object underlying the present invention is to provide efficient infrastructure-supported assistance of a motor vehicle.

This object may be achieved by the present invention. Advantageous embodiments of the present invention are disclosed herein.

According to a first aspect of the present invention, a method for the infrastructure-supported assistance of a motor vehicle is provided. According to an example embodiment of the present invention, the method includes the following steps:
 receiving surroundings signals which are representative of surroundings of the motor vehicle,
 analyzing the surroundings in order to determine a traffic situation in which the motor vehicle is located,
 determining a suggestion for a traffic-directing traffic control measure for the infrastructure-supported assistance of the motor vehicle for an operator based on the determined traffic situation,
 outputting suggestion signals which are representative of the determined suggestion.

According to a second aspect of the present invention, a device, in particular an RSU, is provided, which is configured to carry out all steps of the method according to the first aspect.

According to a third aspect of the present invention, a computer program is provided, which comprises instructions that, when the computer program is executed by a computer, for example by the device according to the second aspect, cause said computer to carry out a method according to the first aspect.

According to a fourth aspect of the present invention, a machine-readable storage medium is provided, on which the computer program according to the third aspect is stored.

The present invention is based on and includes the knowledge that the above object is achieved by presenting an operator with a suggestion as to which traffic-directing traffic control measure he could initiate or trigger in order to support the motor vehicle or assist the motor vehicle. Previously, an operator had to decide for himself, for example based on a video monitoring, which traffic-directing traffic control measure is (best) suitable to support a motor vehicle in a particular traffic situation. According to the present invention disclosed herein, the operator is automatically presented with a suggestion for such a traffic control measure so that the operator can be efficiently supported in his task of supporting the motor vehicle by using an infrastructure. Furthermore, automatically presenting a corresponding suggestion may save time on the part of the operator since he himself no longer needs to schedule time for determining which traffic control measure is appropriate.

Thus, a technical advantage of the present invention is that the motor vehicle can be efficiently supported by the infrastructure or that the motor vehicle can be efficiently assisted in an infrastructure-supported manner.

The suggestion is therefore a suggestion for the further procedure or is a recommendation for action to the operator.

The term "operator" as used within the meaning of the description includes a human person and/or an at least partially automated operator system, for example.

In particular, the term "infrastructure-supported assistance of a motor vehicle" within the meaning of the description means that infrastructure assistance data are provided to the motor vehicle. The motor vehicle can, for example, derive instructions for action based on the infrastructure assistance data. For example, based on the infrastructure assistance data, the motor vehicle itself can decide what to do.

The formulation "in an embodiment of the device according to the first aspect" as used in this description includes the formulation "in an embodiment of the device according to the first aspect, wherein the embodiment comprises the respective features of at least one of the embodiments described in the description." That is to say, the respective features of the embodiments described in the description may also be in any combination.

The abbreviation "RSU" stands for "roadside unit". The term "roadside unit" may be translated into German as a "straßenseitige Einheit" or a "straßenseitige Infrastruktureinheit." Instead of the term "RSU," the following terms may also be used synonymously: roadside unit, roadside infrastructure unit, communication module, roadside communication module, roadside radio unit, roadside transmitting station.

It is noted that if the term "suggestion" is singular, the plural is always implied, and vice versa. That is to say, statements in connection with a suggestion also apply to several suggestions. This applies analogously to the traffic control measure.

In one example embodiment of the present invention, it is provided that the traffic-directing traffic control measure is an element selected from the following group of traffic-directing traffic control measures: controlling a traffic light system to signal a particular signal pattern, opening a lane, closing a lane, redirecting traffic to a lane, blocking a road, blocking a tunnel, requesting service assistance (for example, requesting a breakdown service and/or towing services), requesting emergency support (for example, requesting police and/or fire department and/or emergency physician and/or ambulance and/or rescue helicopter).

This, for example, may bring about the technical advantage that particularly suitable traffic control measures can be suggested.

In one example embodiment of the present invention, it is provided that traffic-control-measure signals representing a traffic-directing traffic control measure triggered by the operator are received, wherein infrastructure assistance data for the infrastructure-supported assistance of the motor vehicle are determined based on the traffic-control-measure signals, wherein infrastructure-assistance-data signals representing the determined infrastructure assistance data are sent to the motor vehicle.

This, for example, may bring about the technical advantage that the traffic-directing traffic control measure triggered by the operator can be efficiently considered when determining the infrastructure assistance data.

The traffic control measure triggered by the operator may also be referred to as an operator traffic control measure.

For example, the operator traffic control measure may be the traffic control measure according to the suggestion or may be another traffic-directing traffic control measure.

In one example embodiment of the present invention, it is provided that a future traffic situation is predicted based on the determined traffic situation, wherein the suggestion for a traffic-directing traffic control measure is determined based on the predicted future traffic situation.

This, for example, may bring about the technical advantage that the suggestion can be determined efficiently.

In one example embodiment of the present invention, it is provided that after outputting the suggestion signals, it is checked whether the operator triggers the determined traffic-directing traffic control measure and/or another traffic-directing traffic control measure, wherein the traffic-directing traffic control measure is automatically triggered based on a result of the check.

This, for example, may bring about the technical advantage that the traffic-directing traffic control measure can be carried out depending on a reaction of the operator. If the check reveals that the operator does not carry out the determined traffic-directing traffic control measure, it is triggered automatically. If the check reveals that the operator triggers a different traffic-directing traffic control measure than the determined traffic-directing traffic control measure, the caused determined traffic-directing traffic control measure is not triggered, and the operator is informed that there is a difference between the determined traffic-directing traffic control measure and his triggered traffic-directing measure, wherein, optionally, for example, a consequence is determined from this difference, the operator being additionally informed of the determined consequence, for example.

This in particular may bring about the technical advantage that the operator has the final responsibility for triggering a traffic-directing traffic control measure. Nevertheless, he is notified that depending on the consequence, he brings about something he does not want because he was mistaken, for example. The individual method steps according to this embodiment are, for example, documented (see also the statements regarding the documentation below).

In one example embodiment of the present invention, it is provided that if the traffic situation comprises several motor vehicles, the several motor vehicles are prioritized based on the determined traffic situations in order to assign a respective priority to the motor vehicles, wherein priority signals are output, which represent the priorities assigned to the several motor vehicles, wherein the suggestion for a traffic-directing traffic control measure is determined based on the priorities assigned to the several motor vehicles.

This, for example, may bring about the technical advantage that the suggestion can be determined efficiently. According to this embodiment, it is therefore provided that the motor vehicles that receive infrastructure assistance through the infrastructure assistance data are prioritized, wherein a respective priority is assigned to the prioritized motor vehicles. The suggestion is determined based on the priorities. Depending on the priority, the motor vehicles require different traffic-directing traffic control measures, for example. If an indication on an electronic display of a particular traffic behavior in the surroundings of the motor vehicle suffices for one motor vehicle, a different motor vehicle requires for example a lane blocking as a traffic-directing traffic control measure. The infrastructure assistance can thus be carried out in a more targeted manner. For example, it is provided that the traffic-conducting traffic control measure is determined for the highest priority vehicle.

In one example embodiment of the present invention, it is provided that an individual criticality is determined for each of the several motor vehicles, wherein the individual criticality specifies an individual accident probability for the respective motor vehicle that the respective motor vehicle will have an accident, wherein the motor vehicles are prioritized based on the determined individual criticalities.

This, for example, may bring about the technical advantage that the suggestion can be determined efficiently. The suggestion thus takes into account the individual accident probability. According to this embodiment, it is thus provided that an individual criticality is determined for each motor vehicle. That is to say, for each motor vehicle, it is determined individually how critical a current individual traffic situation is for the motor vehicle. The more critical the current individual traffic situation is for a respective motor vehicle, the higher that motor vehicle will be prioritized. This can efficiently take into account the circumstance according to which a motor vehicle that is in a critical individual traffic situation requires more infrastructure assistance than a motor vehicle that is in a less critical individual traffic situation. The suggestion can thus be determined in a targeted manner for the vehicle or vehicles that is/are in a particularly critical, individual traffic situation.

In one example embodiment of the method according to the first aspect, it is provided that the method is a computer-implemented method.

Technical functionalities of the method according to the first aspect result from corresponding technical functionalities of the device according to the second aspect, and vice versa.

That is to say, method features result from device features, and vice versa.

In one example embodiment of the method of the present invention, the method is carried out by means of the device according to the second aspect.

In one example embodiment of the present invention, it is provided that the motor vehicle is an at least partially automated guided motor vehicle.

The phrase "at least partially automated guidance" includes one or more of the following cases: assisted guidance, partially automated guidance, highly automated guidance, fully automated guidance.

Assisted guidance (automation level 1) means that a driver of the motor vehicle permanently carries out either the lateral or the longitudinal guidance of the motor vehicle. The respective other driving task (i.e., controlling the longitudinal or lateral guidance of the motor vehicle) is carried out automatically. That is to say, if the motor vehicle is guided, either the lateral or longitudinal guidance is controlled automatically.

Partially automated guidance (automation level 2) means that in a specific situation (for example: driving on a highway, driving within a parking lot, overtaking an object, driving within a lane defined by lane markings) and/or for a certain period of time, a longitudinal and lateral guidance of the motor vehicle is controlled automatically. A driver of the motor vehicle does not need to manually control the longitudinal and lateral guidance of the motor vehicle. However, the driver must permanently monitor the automatic control of the longitudinal and lateral guidance in order to be able to manually intervene if necessary. The driver must be ready at all times to fully take over motor vehicle guidance.

Highly automated guidance (automation stage 3) means that for a certain period of time, in a specific situation (for example: driving on a highway, driving within a parking lot, overtaking an object, driving within a lane defined by lane markings), longitudinal and lateral guidance of the motor vehicle is controlled automatically. A driver of the motor vehicle does not need to manually control the longitudinal and lateral guidance of the motor vehicle. The driver does not need to permanently monitor the automatic control of the longitudinal and lateral guidance in order to be able to manually intervene if necessary. If necessary, a take-over request to take over the control of the longitudinal guidance and the lateral guidance is automatically output, in particular output with a sufficient time reserve, to the driver. The driver thus must potentially be able to take control of the longitudinal and lateral guidance. Limits of automatically controlling lateral and longitudinal guidance are detected automatically. In the case of highly automated guidance, it is not possible to automatically bring about a minimum-risk condition in every given situation.

Fully automated guidance (automation stage 4) means that in a specific situation (for example: driving on a highway, driving within a parking lot, overtaking an object, driving within a lane defined by lane markings), longitudinal and lateral guidance of the motor vehicle is controlled automatically. A driver of the motor vehicle does not need to manually control the longitudinal and lateral guidance of the motor vehicle. The driver does not need to monitor the automatic control of the longitudinal and lateral guidance in order to be able to manually intervene if necessary. Before ending the automatic control of the lateral and longitudinal guidance, the driver is automatically asked to take over the driving task (controlling the lateral and longitudinal guidance of the motor vehicle), in particular with a sufficient time reserve. If the driver does not take over the driving task, it is automatically returned to a minimum-risk condition. Limits of automatically controlling lateral and longitudinal guidance are detected automatically. In all situations, it is possible to automatically return to a minimum-risk system condition.

In one example embodiment of the method of the present invention, it is provided that the motor vehicle is guided manually by a driver (automation level 0).

The terms "assist" and "support" may be used synonymously. In one embodiment, it is provided that the surroundings signals comprise environmental sensor signals of one or more environmental sensors.

For example, an environmental sensor within the meaning of the description is one of the following environmental sensors: radar sensor, lidar sensor, ultrasonic sensor, video sensor, magnetic field sensor, and infrared sensor. The environmental sensor is, for example, an environmental sensor of the motor vehicle, i.e., an on-board environmental sensor. The environmental sensor is, for example, an environmental sensor of the infrastructure, i.e., an infrastructure environmental sensor. In the case of a plurality of environmental sensors, at least one environmental sensor is, for example, an on-board environmental sensor and/or at least one environmental sensor is, for example, an infrastructure environmental sensor.

For example, infrastructure environmental sensors are arranged spatially distributed.

According to one example embodiment of the present invention, it is provided that one or more method steps are documented, in particular documented in a block chain.

This, for example, may bring about the technical advantage that even after the method has been carried out or performed, the method can subsequently be analyzed based on the documentation. Documenting in a block chain in particular has the technical advantage that the documentation is tamper-proof and forgery-proof.

In particular, a block chain is a continuously expandable list of data sets, called blocks, which are interlinked by one or more cryptographic methods. In particular, each block contains a cryptographically secure hash (hash value) of the preceding block, in particular a time stamp, and in particular transaction data.

If the term "device" is used, the term "RSU" is always implied, and vice versa.

The abbreviation "at least one" means "one or more."

In one example embodiment of the present invention, it is provided that a human-machine interface is controlled based on the suggestion signals in order to provide the determined suggestion in a human-understandable manner. For example, the human-machine interface comprises a display device, for example a screen.

Exemplary embodiments of the present invention are illustrated in the figures and explained in more detail in the following description.

DETAILED DESCRIPTION OF EXAMPLE EMBODIMENTS

Figure 1:
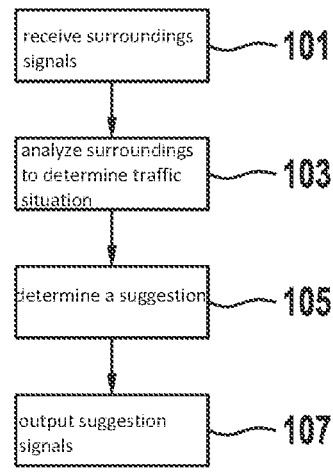
FIG. 1 shows a method for the infrastructure-supported assistance of a motor vehicle, according to an example embodiment of the present invention.

FIG. 1 shows a method for the infrastructure-supported assistance of a motor vehicle, comprising the following steps: receiving 101 surroundings signals which are representative of surroundings of the motor vehicle, analyzing 103 the surroundings in order to determine a traffic situation, in which the motor vehicle is located, determining 105 a suggestion for a traffic-directing traffic control measure for the infrastructure-supported assistance of the motor vehicle for an operator based on the determined traffic situation, outputting 107 suggestion signals which are representative of the determined suggestion.

Figure 2:
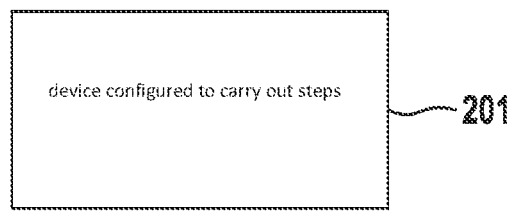
FIG. 2 shows a device, according to an example embodiment of the present invention.

FIG. 2 shows a device 201.

The device 201 is configured to carry out all steps of the method according to the first aspect.

In an embodiment not shown, the device 201 comprises the following:
 a communication device configured to receive surroundings signals representing surroundings of the motor vehicle, and a processor device configured to analyze the surroundings in order to determine a traffic situation in which the motor vehicle is located, wherein the processor device is configured to determine a suggestion for a traffic-directing traffic control measure for the infrastructure-supported assistance of the motor vehicle for an operator based on the determined traffic situation, wherein the communication device is configured to output suggestion signals representing the determined suggestion, in particular to send them via a communication network.

Figure 3:
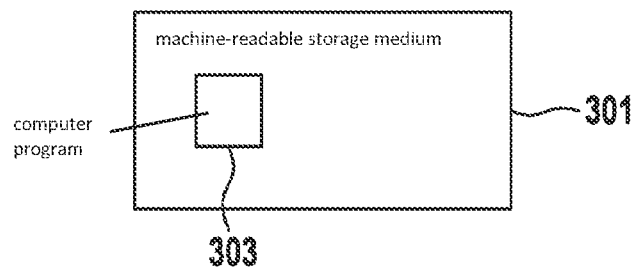
FIG. 3 shows a machine-readable storage medium, according to an example embodiment of the present invention.

FIG. 3 shows a machine-readable storage medium 301.

The machine-readable storage medium 301 stores a computer program 303, which comprises instructions that, when the computer program 303 is executed by a computer, cause said computer to carry out a method according to the first aspect.

Figure 4:
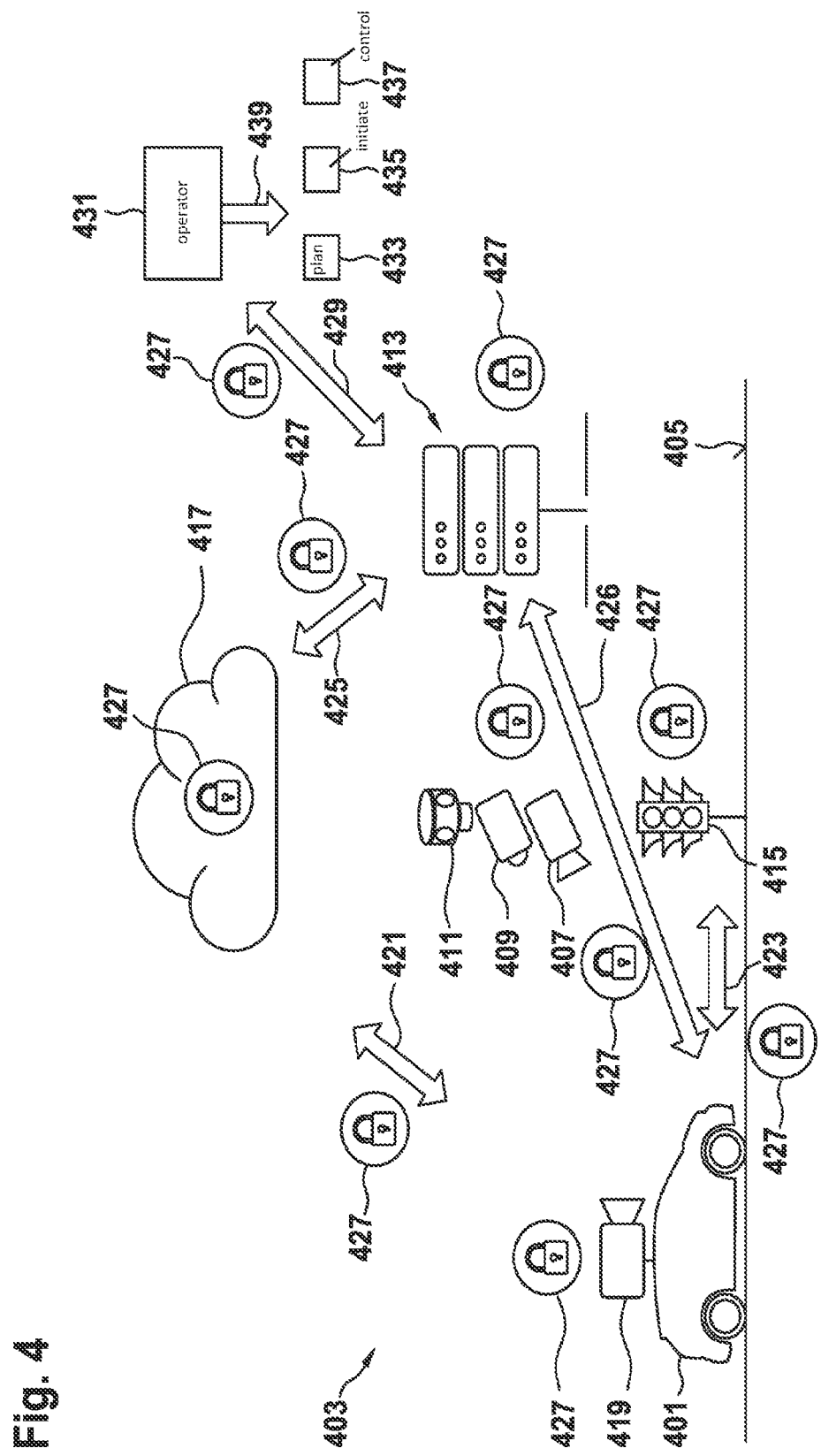
FIG. 4 shows a motor vehicle traveling within an infrastructure, according to an example embodiment of the present invention.

FIG. 4 shows a motor vehicle 401 traveling within an infrastructure 403.

The infrastructure 403 comprises a road 405 on which the motor vehicle 401 travels.

The infrastructure 403 further comprises a video sensor 407, a radar sensor 409, and a lidar sensor 411, these three infrastructure environmental sensors being arranged spatially distributed within the infrastructure 403 and sensing surroundings of the motor vehicle 401. The surroundings signals corresponding to what has respectively been sensed and representing the respectively sensed surroundings are provided to an RSU 413. The RSU 413 is designed according to an embodiment of the device according to the second aspect so that further explanations are omitted.

The RSU 413 receives the surroundings signals, determines infrastructure assistance data based on the surroundings signals, and sends infrastructure-assistance-data signals representing the infrastructure assistance data to the motor vehicle 401.

The RSU 413 may, for example, control a traffic light system 415. For example, the infrastructure assistance data comprise control commands for controlling the traffic light system 415 to display a red light in order to signal the motor vehicle 401 to stop. This is advantageous, for example, if the RSU 413 has determined based on an analysis of the surroundings that there is a critical situation in the direction of travel of the motor vehicle.

Furthermore, a cloud database 417 is optionally provided, which can, for example, provide the RSU 413 with historical traffic data, based on which the RSU 413 determines the infrastructure assistance data.

The motor vehicle 401 comprises a roof-mounted video sensor 419, which senses surroundings of the motor vehicle 401 and outputs surroundings signals corresponding to what has been sensed. For example, these surroundings signals are sent by means of the motor vehicle 401 to the RSU 413 so that the latter can determine the infrastructure assistance data based on these additional surroundings signals.

Furthermore, five double arrows are shown in FIG. 4: A first double arrow 421, a second double arrow 423, a third double arrow 425, a fourth double arrow 426, and a fifth double arrow 429 are drawn. These arrows symbolize a respective communication link between individual elements shown in FIG. 4.

For example, the first double arrow 421 symbolizes a communication link between the motor vehicle 401 and the cloud database 417. The motor vehicle 401 may, for example, upload the surroundings signals of the video camera 419 to the cloud database 417, where they are further processed and combined with surroundings signals from further environmental sensors of further motor vehicles in order to determine a combined environmental model, which is sent to the RSU 413.

The second double-arrow 423 symbolizes a communication link between the motor vehicle 401 and the traffic light system 415. For example, the traffic light system 415 may send a remaining green-light time to the motor vehicle 401 so that based thereon, the motor vehicle is guided in an at least partially automated manner in that a speed is adapted to the remaining green-light time, for example.

The third double arrow 425 symbolizes a communication link between the RSU 413 and the cloud database 417.

The fourth double arrow 426 symbolizes a communication link between the motor vehicle 401 and the RSU 413.

The fifth double arrow 429 symbolizes a communication link between the RSU 413 and an operator 431.

Furthermore, FIG. 4 shows lock symbols with reference sign 427 in order to clarify that the individual communication links, or the transmitted information or data, are optionally encrypted, for example. That is to say, an encrypted communication link is optionally established between the individual communication participants or partners. This means that the individual items of information or data are optionally stored in encrypted form.

The RSU 413 carries out an embodiment of the method according to the first aspect. Accordingly, it outputs the suggestion signals. For example, these signals are sent to the operator 431 via a communication network, for example.

The operator 431 is thus enabled, based on the suggestion, to plan and/or initiate and/or control actions (symbolically represented by quadrilaterals with reference signs 433, 435, 437), which is symbolically represented by an arrow with reference sign 439. For example, the operator 431 may adopt, reject, or modify the suggestion. For example, the RSU 413 may determine infrastructure assistance data for the motor vehicle 401 based on actions 433, 435, 437.

The invention claimed is:

1. A method for infrastructure-supported assistance of a motor vehicle, comprising the following steps:

receiving surroundings signals which are representative of surroundings of the motor vehicle;

analyzing the surroundings in order to determine a traffic situation in which the motor vehicle is located;

determining a suggestion for a traffic-directing traffic control measure for the infrastructure-supported assistance of the motor vehicle for an operator based on the determined traffic situation;

outputting suggestion signals which are representative of the determined suggestion; and after outputting the suggestion signals, checking whether the operator triggers the determined traffic-directing traffic control measure and/or another traffic-directing traffic control measure.

2. The method according to claim 1, wherein the traffic-directing traffic control measure is an element selected from the following group of traffic-directing traffic control measures: controlling a traffic light system to signal a particular signal pattern, opening a lane, closing a lane, redirecting traffic to a lane, blocking a road, blocking a tunnel, requesting service assistance, requesting emergency support.

3. The method according to claim 1, wherein traffic-control-measure signals representing a traffic control measure triggered by the operator are received, wherein infrastructure assistance data for the infrastructure-supported assistance of the motor vehicle are determined based on the traffic-control-measure signals, wherein infrastructure-assistance-data signals representing the determined infrastructure assistance data are sent to the motor vehicle.

4. The method according claim 1, wherein a future traffic situation is predicted based on the determined traffic situation, wherein the suggestion for a traffic-directing traffic control measure is determined based on the predicted future traffic situation.

5. A method for infrastructure-supported assistance of a motor vehicle, comprising:
  receiving surroundings signals which are representative of surroundings of the motor vehicle;
  analyzing the surroundings in order to determine a traffic situation in which the motor vehicle is located;
  determining a suggestion for a traffic-directing traffic control measure for the infrastructure-supported assistance of the motor vehicle for an operator based on the determined traffic situation;
  outputting suggestion signals which are representative of the determined suggestion; and
  after outputting the suggestion signals, checking whether the operator triggers the determined traffic-directing traffic control measure and/or another traffic-directing traffic control measure, wherein the traffic-directing traffic control measure is automatically triggered based on a result of the check.

6. A method for infrastructure-supported assistance of a motor vehicle, comprising:
  receiving surroundings signals which are representative of surroundings of the motor vehicle;
  analyzing the surroundings in order to determine a traffic situation in which the motor vehicle is located;
  determining a suggestion for a traffic-directing traffic control measure for the infrastructure-supported assistance of the motor vehicle for an operator based on the determined traffic situation; and
  outputting suggestion signals which are representative of the determined suggestion,
  wherein, if the traffic situation comprises several motor vehicles, the several motor vehicles are prioritized based on the determined traffic situations in order to assign a respective priority to the motor vehicles, wherein priority signals are output, which represent the priorities assigned to the several motor vehicles, wherein the suggestion for a traffic-directing traffic control measure is determined based on the priorities assigned to the several motor vehicles.

7. The method according to claim 6, wherein an individual criticality is determined for each of the several motor vehicles, wherein the individual criticality specifies an individual accident probability for the respective motor vehicle that the respective motor vehicle will have an accident, wherein the motor vehicles are prioritized based on the determined individual criticalities.

8. A device comprising:
  a roadside unit configured for infrastructure-supported assistance of a motor vehicle, the roadside unit configured to:
    receive surroundings signals which are representative of surroundings of the motor vehicle,
    analyze the surroundings in order to determine a traffic situation in which the motor vehicle is located,
    determine a suggestion for a traffic-directing traffic control measure for the infrastructure-supported assistance of the motor vehicle for an operator based on the determined traffic situation,
    output suggestion signals which are representative of the determined suggestion, and
    after outputting the suggestion signals, check whether the operator triggers the determined traffic-directing traffic control measure and/or another traffic-directing traffic control measure.

9. A non-transitory machine-readable storage medium on which is stored a computer program for infrastructure-supported assistance of a motor vehicle, the computer program, when executed by a computer, causing the computer to perform the following steps:
  receiving surroundings signals which are representative of surroundings of the motor vehicle;
  analyzing the surroundings in order to determine a traffic situation in which the motor vehicle is located;
  determining a suggestion for a traffic-directing traffic control measure for the infrastructure-supported assistance of the motor vehicle for an operator based on the determined traffic situation;
  outputting suggestion signals which are representative of the determined suggestion; and
  after outputting the suggestion signals, checking whether the operator triggers the determined traffic-directing traffic control measure and/or another traffic-directing traffic control measure.

\* \* \* \* \*